United States Patent
Zhao et al.

(10) Patent No.: US 11,968,108 B2
(45) Date of Patent: Apr. 23, 2024

(54) METHOD AND ROUTER FOR LABEL SWITCHED PATH TRACEROUTE

(71) Applicant: Telefonaktiebolaget LM Ericsson (publ), Stockholm (SE)

(72) Inventors: Jinfeng Zhao, Beijing (CN); Xianmin Li, Beijing (CN); Liang Zhou, Beijing (CN)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 343 days.

(21) Appl. No.: 17/432,619

(22) PCT Filed: Feb. 22, 2019

(86) PCT No.: PCT/CN2019/075855
§ 371 (c)(1),
(2) Date: Aug. 20, 2021

(87) PCT Pub. No.: WO2020/168549
PCT Pub. Date: Aug. 27, 2020

(65) Prior Publication Data
US 2022/0141117 A1 May 5, 2022

(51) Int. Cl.
*H04L 43/10* (2022.01)
*H04L 45/50* (2022.01)

(52) U.S. Cl.
CPC .......... *H04L 43/10* (2013.01); *H04L 45/507* (2013.01)

(58) Field of Classification Search
CPC .............................. H04L 43/10; H04L 45/507
USPC ....................................................... 370/329
See application file for complete search history.

(56) References Cited

U.S. PATENT DOCUMENTS

| 2015/0030026 | A1 | 1/2015 | Kumar et al. |
| 2017/0111268 | A1* | 4/2017 | Swallow ................. H04L 45/22 |
| 2017/0244621 | A1 | 8/2017 | Kompella et al. |
| 2018/0026880 | A1* | 1/2018 | Nainar ................... H04L 45/20 |
| | | | 370/389 |

(Continued)

FOREIGN PATENT DOCUMENTS

| WO | 2018/017340 A1 | 1/2018 |
| WO | 2019/007166 A1 | 1/2019 |

OTHER PUBLICATIONS

International Search Report and Written Opinion dated Nov. 20, 2019 in International Application No. PCT/CN2019/075855 (9 pages total).

(Continued)

*Primary Examiner* — Faisal Choudhury
(74) *Attorney, Agent, or Firm* — Weisberg I.P. Law, P.A.

(57) ABSTRACT

The present disclosure provides a method (200) in a router for Label Switched Path, LSP, traceroute. The method (200) includes: receiving (210) an echo request packet containing a label stack; determining (220) from the label stack that forwarding to a downstream router is to be based on a binding segment identifier; identifying (230) a plurality of segments included in a binding segment associated with the binding segment identifier; and transmitting (240) an echo reply packet to a router originating the echo request packet, the echo reply packet containing information indicating a presence of the binding segment identifier in the label stack and indicating a segment identifier associated with each of the plurality of segments.

11 Claims, 7 Drawing Sheets

| | Node A | Node B | Node C | Node D | Node E | Node F | PE2 |
|---|---|---|---|---|---|---|---|
| Hop=1 | NodeSID_A (TTL=1)<br>BSID_A-F (TTL=0)<br>NodeSID_PE2 (TTL=0) | | | | | | |
| Hop=2 | NodeSID_A (TTL=255)<br>BSID_A-F (TTL=2)<br>NodeSID_PE2 (TTL=0) | NodeSID_C (TTL=255)<br>NodeSID_E (TTL=255)<br>NodeSID_F (TTL=1)<br>NodeSID_PE2 (TTL=0) | NodeSID_C (TTL=254)<br>NodeSID_E (TTL=255)<br>NodeSID_F (TTL=1)<br>NodeSID_PE2 (TTL=0) | NodeSID_E (TTL=254)<br>NodeSID_F (TTL=1)<br>NodeSID_PE2 (TTL=0) | NodeSID_E (TTL=253)<br>NodeSID_F (TTL=1)<br>NodeSID_PE2 (TTL=0) | | |
| Hop=3 | NodeSID_A (TTL=255)<br>BSID_A-F (TTL=3)<br>NodeSID_PE2 (TTL=0) | NodeSID_C (TTL=255)<br>NodeSID_E (TTL=255)<br>NodeSID_F (TTL=2)<br>NodeSID_PE2 (TTL=0) | NodeSID_C (TTL=254)<br>NodeSID_E (TTL=255)<br>NodeSID_F (TTL=2)<br>NodeSID_PE2 (TTL=0) | NodeSID_E (TTL=254)<br>NodeSID_F (TTL=2)<br>NodeSID_PE2 (TTL=0) | NodeSID_E (TTL=253)<br>NodeSID_F (TTL=2)<br>NodeSID_PE2 (TTL=0) | NodeSID_F (TTL=1)<br>NodeSID_PE2 (TTL=0) | |
| Hop=4 | NodeSID_A (TTL=255)<br>BSID_A-F (TTL=255)<br>NodeSID_PE2 (TTL=2) | NodeSID_C (TTL=255)<br>NodeSID_E (TTL=255)<br>NodeSID_F (TTL=254)<br>NodeSID_PE2 (TTL=2) | NodeSID_C (TTL=254)<br>NodeSID_E (TTL=255)<br>NodeSID_F (TTL=254)<br>NodeSID_PE2 (TTL=2) | NodeSID_E (TTL=254)<br>NodeSID_F (TTL=254)<br>NodeSID_PE2 (TTL=0) | NodeSID_E (TTL=253)<br>NodeSID_F (TTL=254)<br>NodeSID_PE2 (TTL=0) | NodeSID_F (TTL=253)<br>NodeSID_PE2 (TTL=0) | NodeSID_PE2 (TTL=1) |

(56) References Cited

U.S. PATENT DOCUMENTS

| | | |
|---|---|---|
| 2018/0109450 A1 | 4/2018 | Filsfils et al. |
| 2018/0278510 A1* | 9/2018 | Iqbal et al. |
| 2020/0204479 A1* | 6/2020 | Filsfils .................... H04L 45/74 |
| 2021/0044538 A1* | 2/2021 | Hu ........................ H04L 45/507 |

OTHER PUBLICATIONS

Arora, K. et al., "TTL Procedures for SR-TE Paths in Label Switched Path Traceroute Mechanisms, draft-arora-mpls-spring-ttl-procedures-srte-paths-01", IETF Internet-Draft, Feb. 21, 2019 (10 pages total).

Sivabalan, S. et al., "Carrying Binding Label/Segment-ID in PCE-based Networks, draft-sivabalan-pce-binding-label-SID-06", IETF Internet-Draft, Feb. 5, 2019 (13 pages total).

EPO Communication and Supplementary European Search Report dated Jan. 7, 2022 for Patent Application No. 19916008.6, consisting of 5—pages.

* cited by examiner

|  | Node A | Node B | Node C | Node D | Node E | Node F | PE2 |
|---|---|---|---|---|---|---|---|
| Hop=1 | NodeSID_A (TTL=1)<br>BSID_A-F (TTL=0)<br>NodeSID_PE2 (TTL=0) | | | | | | |
| Hop=2 | NodeSID_A (TTL=255)<br>BSID_A-F (TTL=2)<br>NodeSID_PE2 (TTL=0) | NodeSID_C (TTL=255)<br>NodeSID_E (TTL=255)<br>NodeSID_F (TTL=1)<br>NodeSID_PE2 (TTL=0) | NodeSID_C (TTL=254)<br>NodeSID_E (TTL=255)<br>NodeSID_F (TTL=1)<br>NodeSID_PE2 (TTL=0) | NodeSID_E (TTL=254)<br>NodeSID_F (TTL=1)<br>NodeSID_PE2 (TTL=0) | NodeSID_E (TTL=253)<br>NodeSID_F (TTL=1)<br>NodeSID_PE2 (TTL=0) | | |
| Hop=3 | NodeSID_A (TTL=255)<br>BSID_A-F (TTL=3)<br>NodeSID_PE2 (TTL=0) | NodeSID_C (TTL=255)<br>NodeSID_E (TTL=255)<br>NodeSID_F (TTL=2)<br>NodeSID_PE2 (TTL=0) | NodeSID_C (TTL=254)<br>NodeSID_E (TTL=255)<br>NodeSID_F (TTL=2)<br>NodeSID_PE2 (TTL=0) | NodeSID_E (TTL=254)<br>NodeSID_F (TTL=2)<br>NodeSID_PE2 (TTL=0) | NodeSID_E (TTL=253)<br>NodeSID_F (TTL=2)<br>NodeSID_PE2 (TTL=0) | NodeSID_F (TTL=1)<br>NodeSID_PE2 (TTL=0) | |
| Hop=4 | NodeSID_A (TTL=255)<br>BSID_A-F (TTL=255)<br>NodeSID_F (TTL=254)<br>NodeSID_PE2 (TTL=2) | NodeSID_C (TTL=255)<br>NodeSID_E (TTL=255)<br>NodeSID_F (TTL=254)<br>NodeSID_PE2 (TTL=2) | NodeSID_C (TTL=254)<br>NodeSID_E (TTL=255)<br>NodeSID_F (TTL=254)<br>NodeSID_PE2 (TTL=0) | NodeSID_E (TTL=254)<br>NodeSID_F (TTL=254)<br>NodeSID_PE2 (TTL=0) | NodeSID_E (TTL=253)<br>NodeSID_F (TTL=254)<br>NodeSID_PE2 (TTL=0) | NodeSID_F (TTL=253)<br>NodeSID_PE2 (TTL=0) | NodeSID_PE2 (TTL=1) |

Fig. 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                        Target IPv4 Prefix                     |
+-+-+-+-+-+-+-+-+-+-+-+-+-+-+-+-+-+-+-+-+-+-+-+-+-+-+-+-+-+-+-+-+
| Prefix Length |    Protocol   |       Binding Type (BT)       |
+-+-+-+-+-+-+-+-+-+-+-+-+-+-+-+-+-+-+-+-+-+-+-+-+-+-+-+-+-+-+-+-+
~                   Binding Value (variable length)             ~
+-+-+-+-+-+-+-+-+-+-+-+-+-+-+-+-+-+-+-+-+-+-+-+-+-+-+-+-+-+-+-+-+
```

| | Node A | Node B | Node C | Node D | Node E | Node F | Node PE2 |
|---|---|---|---|---|---|---|---|
| Hop=1 | NodeSID_A (TTL=1)<br>BSID_A-F (TTL=0)<br>NodeSID_PE2 (TTL=0) | | | | | | |
| Hop=2 | NodeSID_A (TTL=255)<br>NodeSID_C (TTL=2)<br>NodeSID_E (TTL=0)<br>NodeSID_F (TTL=0)<br>NodeSID_PE2 (TTL=0) | NodeSID_C (TTL=1)<br>NodeSID_E (TTL=0)<br>NodeSID_F (TTL=0)<br>NodeSID_PE2 (TTL=0) | | | | | |
| Hop=3 | NodeSID_A (TTL=255)<br>NodeSID_C (TTL=3)<br>NodeSID_E (TTL=0)<br>NodeSID_F (TTL=0)<br>NodeSID_PE2 (TTL=0) | NodeSID_C (TTL=2)<br>NodeSID_E (TTL=0)<br>NodeSID_F (TTL=0)<br>NodeSID_PE2 (TTL=0) | NodeSID_C (TTL=1)<br>NodeSID_E (TTL=0)<br>NodeSID_F (TTL=0)<br>NodeSID_PE2 (TTL=0) | | | | |
| Hop=4 | NodeSID_A (TTL=255)<br>NodeSID_C (TTL=255)<br>NodeSID_E (TTL=2)<br>NodeSID_F (TTL=0)<br>NodeSID_PE2 (TTL=0) | NodeSID_C (TTL=254)<br>NodeSID_E (TTL=2)<br>NodeSID_F (TTL=0)<br>NodeSID_PE2 (TTL=0) | NodeSID_C (TTL=253)<br>NodeSID_E (TTL=2)<br>NodeSID_F (TTL=0)<br>NodeSID_PE2 (TTL=0) | NodeSID_E (TTL=1)<br>NodeSID_F (TTL=0)<br>NodeSID_PE2 (TTL=0) | | | |
| Hop=5 | NodeSID_A (TTL=255)<br>NodeSID_C (TTL=255)<br>NodeSID_E (TTL=3)<br>NodeSID_F (TTL=0)<br>NodeSID_PE2 (TTL=0) | NodeSID_C (TTL=254)<br>NodeSID_E (TTL=3)<br>NodeSID_F (TTL=0)<br>NodeSID_PE2 (TTL=0) | NodeSID_C (TTL=254)<br>NodeSID_E (TTL=3)<br>NodeSID_F (TTL=0)<br>NodeSID_PE2 (TTL=0) | NodeSID_E (TTL=2)<br>NodeSID_F (TTL=0)<br>NodeSID_PE2 (TTL=0) | NodeSID_E (TTL=1)<br>NodeSID_F (TTL=0)<br>NodeSID_PE2 (TTL=0) | | |
| Hop=6 | NodeSID_A (TTL=255)<br>NodeSID_C (TTL=255)<br>NodeSID_E (TTL=255)<br>NodeSID_F (TTL=2)<br>NodeSID_PE2 (TTL=0) | NodeSID_C (TTL=254)<br>NodeSID_E (TTL=255)<br>NodeSID_F (TTL=2)<br>NodeSID_PE2 (TTL=0) | NodeSID_C (TTL=253)<br>NodeSID_E (TTL=255)<br>NodeSID_F (TTL=2)<br>NodeSID_PE2 (TTL=0) | NodeSID_E (TTL=254)<br>NodeSID_F (TTL=2)<br>NodeSID_PE2 (TTL=0) | NodeSID_E (TTL=253)<br>NodeSID_F (TTL=2)<br>NodeSID_PE2 (TTL=0) | NodeSID_F (TTL=1)<br>NodeSID_PE2 (TTL=0) | |
| Hop=7 | NodeSID_A (TTL=255)<br>NodeSID_C (TTL=255)<br>NodeSID_E (TTL=255)<br>NodeSID_F (TTL=255)<br>NodeSID_PE2 (TTL=2) | NodeSID_C (TTL=255)<br>NodeSID_E (TTL=255)<br>NodeSID_F (TTL=255)<br>NodeSID_PE2 (TTL=2) | NodeSID_C (TTL=255)<br>NodeSID_E (TTL=255)<br>NodeSID_F (TTL=255)<br>NodeSID_PE2 (TTL=2) | NodeSID_E (TTL=254)<br>NodeSID_F (TTL=255)<br>NodeSID_PE2 (TTL=2) | NodeSID_E (TTL=253)<br>NodeSID_F (TTL=255)<br>NodeSID_PE2 (TTL=2) | NodeSID_F (TTL=254)<br>NodeSID_PE2 (TTL=2) | NodeSID_PE2 (TTL=1) |

Fig. 5

| | Node A | Node B | Node C | Node D | Node E | Node F | Node PE2 |
|---|---|---|---|---|---|---|---|
| Hop=1 | NodeSID_A (TTL=1)<br>BSID_A-PE2 (TTL=0) | | | | | | |
| Hop=2 | NodeSID_A (TTL=255)<br>NodeSID_B (TTL=1)<br>BSID_B-E (TTL=0)<br>NodeSID_PE2 (TTL=0) | NodeSID_B (TTL=1)<br>BSID_B-E (TTL=0)<br>NodeSID_PE2 (TTL=0) | | | | | |
| Hop=3 | NodeSID_A (TTL=255)<br>NodeSID_B (TTL=255)<br>ADJSID_B-C (TTL=1)<br>NodeSID_D (TTL=1)<br>NodeSID_E (TTL=1)<br>NodeSID_PE2 (TTL=0) | NodeSID_B (TTL=254)<br>ADJSID_B-C (TTL=2)<br>NodeSID_D (TTL=1)<br>NodeSID_E (TTL=0)<br>NodeSID_PE2 (TTL=0) | NodeSID_D (TTL=1)<br>NodeSID_E (TTL=0)<br>NodeSID_PE2 (TTL=0) | | | | |
| Hop=4 | NodeSID_A (TTL=255)<br>NodeSID_B (TTL=255)<br>ADJSID_B-C (TTL=255)<br>NodeSID_D (TTL=2)<br>NodeSID_E (TTL=0)<br>NodeSID_PE2 (TTL=0) | NodeSID_B (TTL=254)<br>ADJSID_B-C (TTL=255)<br>NodeSID_D (TTL=2)<br>NodeSID_E (TTL=0)<br>NodeSID_PE2 (TTL=0) | NodeSID_D (TTL=2)<br>NodeSID_E (TTL=0)<br>NodeSID_PE2 (TTL=0) | NodeSID_D (TTL=1)<br>NodeSID_E (TTL=0)<br>NodeSID_PE2 (TTL=0) | | | |
| Hop=5 | NodeSID_A (TTL=255)<br>NodeSID_B (TTL=255)<br>ADJSID_B-C (TTL=255)<br>NodeSID_D (TTL=255)<br>NodeSID_E (TTL=2)<br>NodeSID_PE2 (TTL=0) | NodeSID_B (TTL=254)<br>ADJSID_B-C (TTL=255)<br>NodeSID_D (TTL=255)<br>NodeSID_E (TTL=2)<br>NodeSID_PE2 (TTL=0) | NodeSID_D (TTL=255)<br>NodeSID_E (TTL=2)<br>NodeSID_PE2 (TTL=0) | NodeSID_D (TTL=254)<br>NodeSID_E (TTL=2)<br>NodeSID_PE2 (TTL=0) | NodeSID_E (TTL=1)<br>NodeSID_PE2 (TTL=0) | | |
| Hop=6 | NodeSID_A (TTL=255)<br>NodeSID_B (TTL=255)<br>ADJSID_B-C (TTL=255)<br>NodeSID_D (TTL=255)<br>NodeSID_E (TTL=255)<br>NodeSID_PE2 (TTL=2) | NodeSID_B (TTL=254)<br>ADJSID_B-C (TTL=255)<br>NodeSID_D (TTL=255)<br>NodeSID_E (TTL=255)<br>NodeSID_PE2 (TTL=2) | NodeSID_D (TTL=255)<br>NodeSID_E (TTL=255)<br>NodeSID_PE2 (TTL=2) | NodeSID_D (TTL=254)<br>NodeSID_E (TTL=255)<br>NodeSID_PE2 (TTL=2) | NodeSID_E (TTL=254)<br>NodeSID_PE2 (TTL=2) | NodeSID_PE2 (TTL=1) | |
| Hop=7 | NodeSID_A (TTL=255)<br>NodeSID_B (TTL=255)<br>ADJSID_B-C (TTL=255)<br>NodeSID_D (TTL=255)<br>NodeSID_E (TTL=255)<br>NodeSID_PE2 (TTL=3) | NodeSID_B (TTL=254)<br>ADJSID_B-C (TTL=255)<br>NodeSID_D (TTL=255)<br>NodeSID_E (TTL=255)<br>NodeSID_PE2 (TTL=3) | NodeSID_D (TTL=255)<br>NodeSID_E (TTL=255)<br>NodeSID_PE2 (TTL=3) | NodeSID_D (TTL=254)<br>NodeSID_E (TTL=255)<br>NodeSID_PE2 (TTL=3) | NodeSID_E (TTL=254)<br>NodeSID_PE2 (TTL=3) | NodeSID_PE2 (TTL=2) | NodeSID_PE2 (TTL=1) |

Fig. 6

METHOD AND ROUTER FOR LABEL SWITCHED PATH TRACEROUTE

CROSS REFERENCE TO RELATED APPLICATIONS

This application is a 35 U.S.C. § 371 National Stage of International Patent Application No. PCT/CN2019/075855, filed Feb. 22, 2019.

TECHNICAL FIELD

The present disclosure relates to communication technology, and more particularly, to methods and routers for Label Switched Path (LSP) traceroute.

BACKGROUND

Currently, Segment Routing (SR) LSPs are used with Software Defined Networking (SDN) to enable network programming of Traffic Engineering (TE) paths.

Request For Comments (RFC) 8029, *Detecting MPLS Data-Plane Failures*, which is incorporated here by reference in its entirety, defines a "Multi-Protocol Label Switching (MPLS) echo request" and an "MPLS echo reply" for detecting data-plane failures.

RFC 8287, *Label Switched Path (LSP) Ping/Traceroute for Segment Routing (SR) IGP-Prefix and IGP-Adjacency Segment Identifiers (SIDs) with MPLS Data Planes*, which is incorporated here by reference in its entirety, defines traceroute as a diagnostic tool for on-demand checking of failures in an SR-based LSP.

Internet Draft, *draft-sivabalan-pce-binding-label-sid-06, Carrying Binding Label/Segment-ID in PCE-based Networks*, S. Sivabalan, et al., February 2019, which is incorporated here by reference in its entirety, proposes using binding segments in SR to provide greater scalability.

It is desired to apply the traceroute technique to an SR-based LSP that includes one or more binding segments.

SUMMARY

It is an object of the present disclosure to provide methods and routers for LSP traceroute, capable of traversing every hop in an LSP including one or more binding segments properly.

According to a first aspect of the present disclosure, a method in a router for LSP traceroute is provided. The method includes: receiving an echo request packet containing a label stack; determining from the label stack that forwarding to a downstream router is to be based on a binding segment identifier; identifying a plurality of segments included in a binding segment associated with the binding segment identifier; and transmitting an echo reply packet to a router originating the echo request packet, the echo reply packet containing information indicating a presence of the binding segment identifier in the label stack and indicating a segment identifier associated with each of the plurality of segments.

In an embodiment, the echo reply packet may be transmitted in response to determining that an outermost label of the label stack or a label in the label stack that is to be used for forwarding is associated with a predetermined Time To Live (TTL) value.

In an embodiment, the information may be included in a Target Forwarding Equivalence Class (FEC) stack Type-Length-Value (TLV).

In an embodiment, the Target FEC stack TLV may be included in an FEC stack change sub-TLV in a Downstream Detailed Mapping TLV.

In an embodiment, each of the plurality of segments may include one of an adjacency segment, a node segment or a binding segment.

According to a second aspect of the present disclosure, a method in a router for LSP traceroute is provided. The method includes: transmitting an echo request packet containing a label stack; receiving an echo reply packet responsive to the echo request packet, the echo reply packet containing information indicating a presence of a binding segment identifier in the label stack and indicating a segment identifier associated with each of a plurality of segments included in a binding segment associated with the binding segment identifier; and transmitting a further echo request packet containing a changed label stack in which the binding segment identifier is replaced with the respective segment identifiers associated with the plurality of segments.

In an embodiment, the information may be included in a Target FEC stack TLV.

In an embodiment, the Target FEC stack TLV may be included in an FEC stack change sub-TLV in a Downstream Detailed Mapping TLV.

In an embodiment, each of the plurality of segments may include one of an adjacency segment, a node segment or a binding segment.

According to a third aspect of the present disclosure, a router is provided. The router includes a communication interface, a processor and a memory. The memory contains instructions executable by the processor whereby the router is operative to perform the method according to the above first or second aspect.

According to a fourth aspect of the present disclosure, a computer readable storage medium is provided. The computer readable storage medium has computer program instructions stored thereon. The computer program instructions, when executed by a processor in a router, cause the router to perform the method according to any of first or second aspect.

With the embodiments of the present disclosure, when a router receives an echo request packet for an LSP and determines that forwarding to a downstream router is to be based on a binding segment identifier, it identifies a plurality of segments included in a binding segment associated with the binding segment identifier and transmits an echo reply packet to a router originating the echo request packet, containing information indicating a segment identifier associated with each of the plurality of segments. Upon receiving the echo reply packet, the router originating the echo request packet can change a label stack associated with the LSP, by replacing the binding segment identifier with the respective segment identifiers, before transmitting a further echo request packet. In this way, the LSP traceroute mechanism can properly traverse every hop in an LSP including one or more binding segments.

BRIEF DESCRIPTION OF THE DRAWINGS

The above and other objects, features and advantages will be more apparent from the following description of embodiments with reference to the figures, in which:

FIG. 1 is a schematic diagram showing an example of traceroute for an LSP including a binding segment;

FIG. 5 is a schematic diagram showing an example of LSP traceroute according to the present disclosure;

FIG. 6 is a schematic diagram showing another example of LSP traceroute according to the present disclosure;

DETAILED DESCRIPTION

Figure 2:
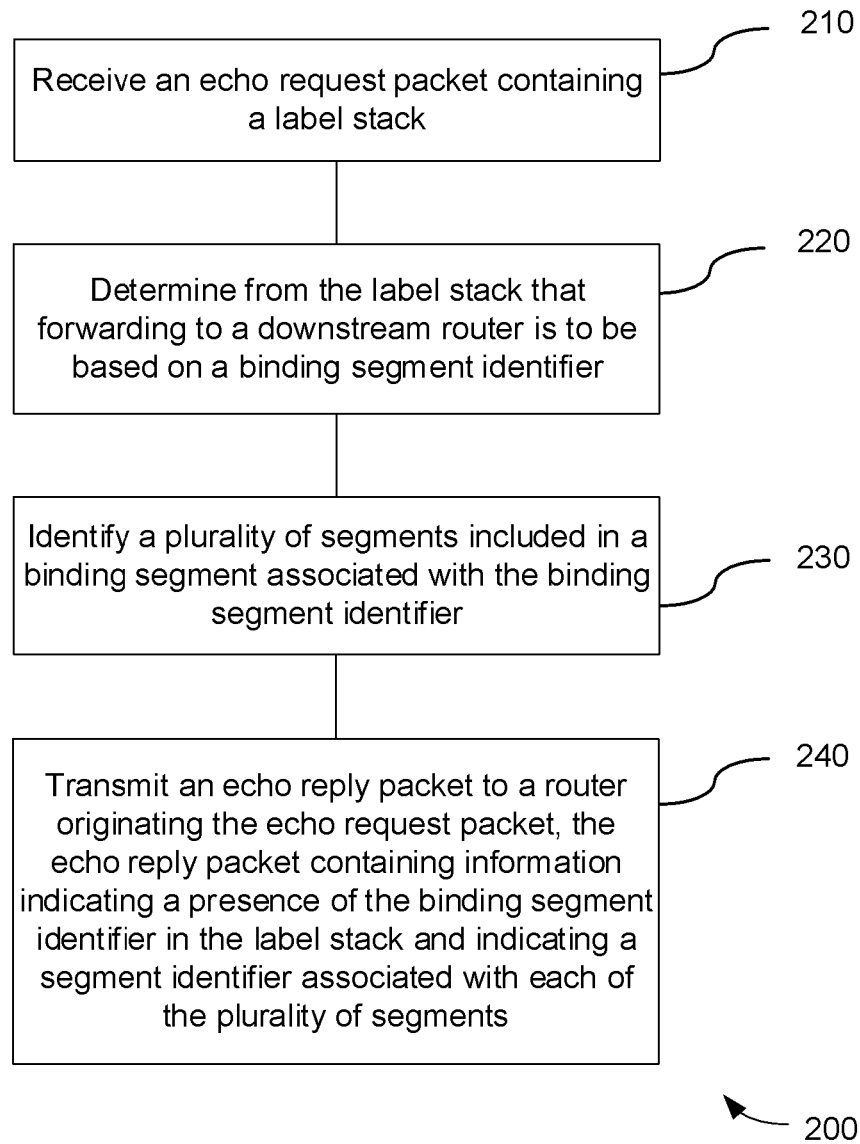
FIG. 2 is a flowchart illustrating a method for LSP traceroute according to an embodiment of the present disclosure.

In the following, references in the specification to "one embodiment", "an embodiment", "an example embodiment" and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

The traceroute mechanism operates on a hop-by-hop basis. The desired behavior of LSP traceroute is that each router (also referred to as "node" hereinafter) along an LSP transmits an echo reply packet to a router originating an echo request packet. However, when the LSP includes a binding segment, the conventional traceroute mechanism may not properly traverse every hop in the LSP, i.e., may not get an echo reply from every node along the LSP properly.

FIG. 1 shows an example of traceroute for an LSP including a binding segment. As shown, in this example, an LSP has a topological path from a Provider Edge (PE) router, PE1, to a PE router, PE2, including intermediate routers, Node A, Node B, Node C, Node D, Node E and Node F, sequentially. The LSP has an SR-based label stack of {NodeSID_A, BSID_A-F, NodeSID_PE2}, where NodeSID_A is a Node Segment Identifier (SID) for Node A, BSID_A-F is a Binding Segment ID (BSID) of a binding segment configured at Node A and including node segments for Node C, Node E and Node F (associated with NodeSID_C, NodeSID_E, and NodeSID_F, respectively), and NodeSID_PE2 is a Node SID for PE2.

Initially, referring to the line "Hop=1" in FIG. 1, PE1 transmits a first echo request packet (e.g., an MPLS echo request defined in RFC 8029) containing the label stack {NodeSID_A, BSID_A-F, NodeSID_PE2} to Node A. Each of the labels in the label stack is associated with a Time-To-Live (TTL) value. The labels and their associated TTL values in the label stack contained in each echo request packet received by each node are listed in FIG. 1. As shown, in the label stack contained in the first echo request packet, NodeSID_A is associated with TTL=1 and BSID_A-F is associated with TTL=0. Upon receiving the first echo request packet, Node A pops the outermost label of the label stack, NodeSID_A. According to the traceroute mechanism, since the label NodeSID_A is associated with TTL=1, Node A needs to transmit an echo reply packet to PE1. Further, after NodeSID_A has been popped, the outermost label of the label stack, i.e., the label to be used for forwarding, is now BSID_A-F, which is configured at Node A. Thus, Node A can interpret BSID_A-F as {NodeSID_C, NodeSID_E, NodeSID_F} and determine that the downstream node in the LSP is Node B (it is configured at Node A that a packet to be forwarded based on NodeSID_C is to be forwarded via the interface towards Node B). In this case, Node A transmits an echo reply packet to PE1, indicating an address of the downstream node (Node B) and including a Downstream Detailed Mapping TLV as follows:

Downstream Detailed Mapping TLV
Return Code="Label switched with FEC change"
Return Subcode=0
FEC stack change Sub-TLV
  Operation Type=POP
FEC stack change Sub-TLV
  Operation Type=POP
FEC stack change Sub-TLV
  Operation Type=PUSH
  Target FEC stack TLV (Type=36 IPv4 NodeSID) IPv4 Prefix=loopback address of Node F
FEC stack change Sub-TLV
  Operation Type=PUSH
  Target FEC stack TLV (Type=34 IPv4 NodeSID) IPv4 Prefix=loopback address of Node E
FEC stack change Sub-TLV
  Operation Type=PUSH
  Target FEC stack TLV (Type=34 IPv4 NodeSID) IPv4 Prefix=loopback address of Node C
Label stack Sub-TLV
  Label_1=NodeSID_C
  Label_2=NodeSID_E
  Label_3=NodeSID_F For details of the above Downstream Detailed Mapping TLV, reference can be made to RFC 8029 and description thereof will be omitted here.

Upon receiving the echo reply packet from Node A, PE1 transmits a second echo request packet to Node A, indicating the address of Node B as the address of the expected downstream node. Referring to the line "Hop=2" in FIG. 1, in the label stack contained in the second echo request packet, NodeSID_A is associated with TTL=255 and BSID_A-F is associated with TTL=2. Upon receiving the second echo request packet, Node A pops NodeSID_A and BSID_A-F and pushes NodeSID_F, NodeSID_E and NodeSID_C to the label stack, with NodeSID_C associated with TTL=255, NodeSID_E associated with TTL=255 and NodeSID_F associated with TTL=1 (i.e., the TTL value associated with BSID_A-F minus 1). Then, Node A forwards to the echo request packet with the changed label stack to Node B. Node B, Node C and Node D simply forward the echo request packet downstream according to conventional forwarding rules, as shown in FIG. 1. When Node E receives the echo request packet from Node D, it pops NodeSID_E and, after that, the outermost label of the label stack, i.e., the label to be used for forwarding, is now NodeSID_F. According to the traceroute mechanism, since the label NodeSID_F is associated with TTL=1, Node E needs to transmit an echo reply packet to PE1 (without forwarding the echo request packet to Node F). In this case, however, Node E finds that the address of the expected downstream node, i.e., the address of Node B, does not match the address of the actual incoming interface of the echo request packet, i.e., the address of Node E. Accordingly, Node E transmits an echo reply packet to PE1, containing an error code "Downstream Mapping Mismatch" and indicating an address of the downstream node (Node F).

Upon receiving the echo reply packet from Node E, PE1 transmits a third echo request packet to Node A, indicating the address of Node F as the address of the expected downstream node. Referring to the line "Hop=3" in FIG. 1, in the label stack contained in the second echo request packet, BSID_A-F is associated with TTL=3. This time the echo request packet can be forwarded successfully to Node F, which transmits an echo reply packet to PE1, indicating an address of the downstream node (PE2). Upon receiving the echo reply packet from Node F, PE1 transmits a fourth echo request packet to Node A, indicating the address of PE2 as the address of the expected downstream node. Referring to the line "Hop=4" in FIG. 1, in the label stack contained in the second echo request packet, BSID_A-F is associated with TTL=255 and NodeSID_PE2 is associated with TTL=2. The echo request packet can be forwarded successfully to PE2, which transmits an echo reply packet to PE1.

Therefore, in this case, PE1 receives no reply from Node B, Node C and Node D, which violates the desired hop-by-hop behavior of the traceroute mechanism. While PE1 receives an echo reply packet from Node E, the echo reply packet contains an error code "Downstream Mapping Mismatch", which is undesired.

FIG. 2 is a flowchart illustrating a method 200 for LSP traceroute according to an embodiment of the present disclosure. The method 200 can be performed at a router, e.g., Node A in FIG. 1.

At block 210, an echo request packet is received. The echo request packet contains a label stack. The echo request packet can be the first echo request packet as described above in connection with FIG. 1. Here, the echo request packet can be received from a router originating the echo request packet directly, or from an upstream forwarding node.

At block 220, it is determined from the label stack that forwarding to a downstream router is to be based on a binding segment identifier. Here, referring to the example shown in FIG. 1, Node A can pop NodeSID_A and determine that forwarding to its downstream router (Node B) is to be based on a binding segment identifier (BSID_A-F).

At block 230, a plurality of (e.g., two or more) segments included in a binding segment associated with the binding segment identifier are identified. Here, referring to the example shown in FIG. 1, Node A can identify that BSID_A-F is associated with the binding segment including node segments for Node C, Node E and Node F, associated with NodeSID_C, NodeSID_E, and NodeSID_F, respectively.

At block 240, an echo reply packet is transmitted to a router originating the echo request packet. The echo reply packet contains information indicating a presence of the binding segment identifier in the label stack and indicating a segment identifier associated with each of the plurality of segments. Here, referring to the example shown in FIG. 1, Node A can transmit to PE1 an echo reply packet containing information indicating the presence of BSID_A-F in the label stack and indicating NodeSID_C, NodeSID_E, and NodeSID_F.

Here, in the block 240, the echo reply packet can be transmitted in response to determining that an outermost label of the label stack or a label in the label stack that is to be used for forwarding is associated with a predetermined TTL value (e.g., TTL=1).

Figures 3, 4:
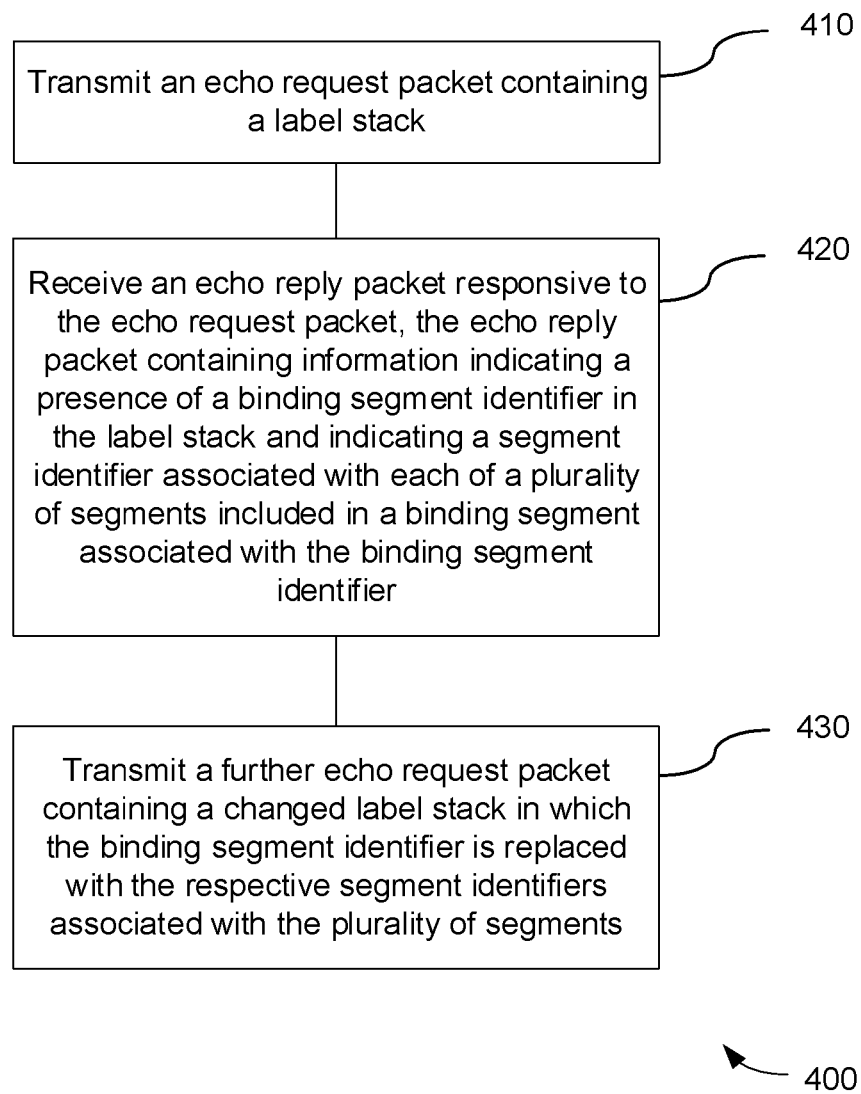
FIG. 3 is a schematic diagram showing an exemplary format of a Target FEC stack TLV according to an embodiment of the present disclosure.
FIG. 4 is a flowchart illustrating a method for LSP traceroute according to another embodiment of the present disclosure.

In an example, the information can be included in a Target FEC stack TLV. For example, two new Target FEC stack TLVs can be defined, one for IPv4 BSID (type=x1) and one for IPv6 BSID (type=x2), where x1 and x2 can be any appropriate values. FIG. 3 shows an exemplary format of a Target FEC stack TLV for IPv4 BSID according to an embodiment of the present disclosure. The format shown in FIG. 3 includes the following fields:

Target IPv4 Prefix, which carries an IPv4 Prefix for an egress address of an LSP;

Prefix Length, which is one octet and gives a length of the IPv4 prefix in bits (value ranging from 1 to 32);

Protocol: which is set to 1 if the responder MUST perform FEC validation using Open Shortest Path First (OSPF) as Interior Gateway Protocol (IGP), 2 if the responder MUST perform Egress FEC validation using the Intermediate System to Intermediate System (IS-IS) as IGP, or 0 if the responder can use any IGP for Egress FEC validation; and Binding Type and Binding Value, which can reuse definitions in Section 3, Path Binding TLV in Internet Draft, draft-sivabalan-pce-binding-label-sid-06.

The format of Target FEC stack TLV for IPv6 BSID can be substantially the same as Target FEC stack TLV for IPv4 BSID, only that the above Target IPv4 Prefix can be replaced with Target IPV6 Prefix and the length of the field can be changed from 32 bits to 128 bits.

For example, the Target FEC stack TLV can be included in an FEC stack change sub-TLV in a Downstream Detailed Mapping TLV. When applied to the example shown in FIG. 1, the Downstream Detailed Mapping TLV here may contain the following information (assuming that Target FEC stack TLV for IPv4 BSID is used):

Downstream Detailed Mapping TLV
Return Code="Label switched with FEC change"
Return Subcode=0
FEC stack change Sub-TLV
　Operation Type=POP
FEC stack change Sub-TLV
　Operation Type=POP
FEC stack change Sub-TLV
　Operation Type=PUSH
　Target FEC stack TLV (Type=x1 IPv4 BSID)
　　IPv4 Prefix=loopback address of egress Bind value_1=NodeSID_C
Bind value_2=NodeSID_E
Bind value_3=NodeSID_F
Label stack Sub-TLV
    Label_1=NodeSID_C
    Label_2=NodeSID_E
    Label_3=NodeSID_F Here, the above Target FEC stack TLV (Type=x1 IPv4 BSID) indicates presence of a BSID in the label stack (in this example it does not indicate explicitly which label in the label stack is the BSID, i.e., it does not indicate BSID_A-F explicitly) and NodeSID_C, NodeSID_E and NodeSID_F associated with the node segments included in the binding segment BSID_A-F. The Target FEC stack TLV may also include a loopback address of egress of the binding segment (i.e., Node F). The Target FEC stack TLV is included in an FEC stack change sub-TLV having an Operation Type of "PUSH". Before that FEC stack change sub-TLV, the Downstream Detailed Mapping TLV further includes two FEC stack change sub-TLVs each having an Operation Type of "POP". This means that, for forwarding towards the downstream node, Node A will pop NodeSID_A and BSID_A-F and push NodeSID_C, NodeSID_E and NodeSID_F to the label stack. For details of the other information in the Downstream Detailed Mapping TLV, reference can be made to RFC 8029 and description thereof will be omitted here.

In the above example, each of the segments included in the binding segment is a node segment. Alternatively, each of the segments can be an adjacency segment or even a binding segment. In other words, the binding segment may be any combination of node segments, adjacency segments and/or binding segments.

FIG. 4 is a flowchart illustrating a method 400 for LSP traceroute according to another embodiment of the present disclosure. The method 400 can be performed at a router originating an echo request packet, e.g., PE1 in FIG. 1.

At block 410, an echo request packet is transmitted. The echo request packet contains a label stack. The echo request packet can be the echo request packet as described above in connection with the block 210 in FIG. 2.

At block 420, an echo reply packet responsive to the echo request packet is received. The echo reply packet contains information indicating a presence of a binding segment identifier in the label stack and indicating a segment identifier associated with each of a plurality of segments included in a binding segment associated with the binding segment identifier. The echo reply packet can be the echo reply packet as described above in connection with the block 240 in FIG. 2.

As described above in connection with FIG. 2, the information can be included in a Target FEC stack TLV. The Target FEC stack TLV can be included in an FEC stack change sub-TLV in a Downstream Detailed Mapping TLV.

At block 430, a further echo request packet is transmitted. The further echo request packet contains a changed label stack in which the binding segment identifier is replaced with the respective segment identifiers associated with the plurality of segments. Here, referring to the example in FIG. 1, the further echo request packet can be the second echo request packet in FIG. 1, except that BSID_A-F is replaced with NodeSID_C, NodeSID_E and NodeSID_F in its label stack.

Here, the binding segment identifier in the label stack can be identified based on FEC stack change Sub-TLVs in the Downstream Detailed Mapping TLV. For example, referring to the Downstream Detailed Mapping TLV as described above in connection with FIG. 2, PE1 can derive from the FEC stack change Sub-TLVs that Node A will pop NodeSID_A and BSID_A-F and push NodeSID_C, NodeSID_E and NodeSID_F to the label stack for forwarding towards its downstream node. Accordingly, PE1 can identify that BSID_A-F is to be replaced with NodeSID_C, NodeSID_E and NodeSID_F in the label stack.

In an example, each of the plurality of segments may include one of an adjacency segment, a node segment or a binding segment.

In the following, the above methods 200 and 400 will be further explained with reference to FIGS. 5 and 6.

FIG. 5 is a schematic diagram showing an example of LSP traceroute. Here, the same LSP, i.e., the same topological path and the same label stack, as FIG. 1 is assumed. As shown in FIG. 5, initially, referring to the line "Hop=1", PE1 transmits a first echo request packet containing the label stack {NodeSID_A, BSID_A-F, NodeSID_PE2} to Node A. In the label stack contained in the first echo request packet, NodeSID_A is associated with TTL=1 and BSID_A-F is associated with TTL=0. Upon receiving the first echo request packet, Node A pops the outermost label of the label stack, NodeSID_A. Since the label NodeSID_A is associated with TTL=1, Node A needs to transmit an echo reply packet to PE1. Further, after NodeSID_A has been popped, the outermost label of the label stack, i.e., the label to be used for forwarding, is now BSID_A-F. Node A identifies that BSID_A-F is associated with the binding segment including segments NodeSID_C, NodeSID_E, and NodeSID_F, and transmits to PE1 an echo reply packet containing information indicating the presence of BSID_A-F in the label stack and indicating NodeSID_C, NodeSID_E, and NodeSID_F. The echo reply packet also indicates an address of the downstream node (Node B).

Upon receiving the echo reply packet from Node A, PE1 transmits a second echo request packet to Node A, indicating the address of Node B as the address of the expected downstream node. Referring to the line "Hop=2", in the label stack contained in the second echo request packet, BSID_A-F is replaced with NodeSID_C, NodeSID_E and NodeSID_F, NodeSID_A is associated with TTL=255 and NodeSID_C is associated with TTL=2. Node A pops NodeSID_A and forwards to the echo request packet with the changed label stack to Node B, with TTL associated with NodeSID_C reduced to 1. Upon receiving the echo request packet from Node A, Node B pops the outermost label of the label stack, NodeSID_C. Since the label NodeSID_C is associated with TTL=1, Node B needs to transmit an echo reply packet to PE1. In this case, the address of the expected downstream node, i.e., the address of Node B, matches the address of the actual incoming interface of the echo request packet, i.e., the address of Node B. Accordingly, the echo reply packet can be transmitted properly, without the error code "Downstream Mapping Mismatch" as in the case of FIG. 1.

The subsequent traceroute process as shown in the lines "Hop=3", "Hop=4", "Hop=5", "Hop=6" and "Hop=7" of FIG. 5 simply follows RFC 8029 and RFC 8287. It can be seen from FIG. 5 that, with the embodiments according to the present disclosure, each of the nodes along the LSP, i.e., Node A, Node B, Node C, Node D, Node E, Node F and Node PE2, can return an echo reply packet to PE1 properly.

FIG. 6 is a schematic diagram showing another example of LSP traceroute. Here, the same topological path as FIG. 1 is assumed, while an LSP involving an adjacency segment and nested binding segments is considered. In this example, the LSP has a label stack of {NodeSID_A, BSID_A-PE2}, where BSID_A-PE2 is a BSID of a binding segment configured at Node A and including segments NodeSID_B, BSID_B-E and NodeSID_PE2. Here, BSID_B-E is a BSID for a binding segment configured at Node B and including segments AdjSID_B-C, NodeSID_D and NodeSID_E, where AdjSID_B-C is an adjacency segment identifier of an adjacency segment configured at Node B for forwarding to Node C.

As shown in FIG. 6, initially, referring to the line "Hop=1", PE1 transmits a first echo request packet containing the label stack {NodeSID_A, BSID_A-PE2} to Node A. In the label stack contained in the first echo request packet, NodeSID_A is associated with TTL=1 and BSID_A-PE2 is associated with TTL=0. Upon receiving the first echo request packet, Node A pops the outermost label of the label stack, NodeSID_A. Since the label NodeSID_A is associated with TTL=1, Node A needs to transmit an echo reply packet to PE1. Further, after NodeSID_A has been popped, the outermost label of the label stack, i.e., the label to be used for forwarding, is now BSID_A-PE2. Node A identifies that BSID_A-PE2 is associated with the binding segment including segments NodeSID_B, BSID_B-E and NodeSID_PE2, and transmits to PE1 an echo reply packet containing information indicating the presence of BSID_A-PE2 in the label stack and indicating NodeSID_B, BSID_B-E and NodeSID_PE2.

Upon receiving the echo reply packet from Node A, PE1 transmits a second echo request packet to Node A. Referring to the line "Hop=2", in the label stack contained in the second echo request packet, BSID_A-PE2 is replaced with NodeSID_B, BSID_B-E and NodeSID_PE2, NodeSID_A is associated with TTL=255 and NodeSID_B is associated with TTL=2. Node A simply pops NodeSID_A and forwards the echo request packet to Node B, with the TTL associated with NodeSID_B reduced to 1. Upon receiving the echo reply packet from Node A, Node B pops NodeSID_B. Since the label NodeSID_B is associated with TTL=1, Node B needs to transmit an echo reply packet to PE1. Further, after NodeSID_B has been popped, the outermost label of the label stack, i.e., the label to be used for forwarding, is now BSID_B-E. Node B identifies that BSID_B-E is associated with the binding segment including segments AdjSID_B-C, NodeSID_D and NodeSID_E, and transmits to PE1 an echo reply packet containing information indicating the presence of BSID_B-E in the label stack and indicating AdjSID_B-C, NodeSID_D and NodeSID_E.

Upon receiving the echo reply packet from Node B, PE1 transmits a third echo request packet to Node A. Referring to the line "Hop=3", in the label stack contained in the third echo request packet, BSID_B-E is replaced with AdjSID_B-C, NodeSID_D and NodeSID_E, each of NodeSID_A and NodeSID_B is associated with TTL=255, AdjSID_B-C is associated with TTL=2 and NodeSID_D is associated with TTL=1. Node A simply pops NodeSID_A and forwards the echo request packet to Node B, with the TTL associated with NodeSID_B reduced to 254. Upon receiving the echo reply packet from Node A, Node B pops NodeSID_B and AdjSID_B-C and forwards the echo request packet to Node C based on AdjSID_B-C. Upon receiving the echo reply packet from Node B, Node C pops NodeSID_D. Since the label NodeSID_D is associated with TTL=1, Node C transmits an echo reply packet to PE1.

The subsequent traceroute process as shown in the lines "Hop=4", "Hop=5", "Hop=6" and "Hop=7" of FIG. 6 simply follows RFC 8029 and RFC 8287. It can be seen from FIG. 6 that, with the embodiments according to the present disclosure, each of the nodes along the LSP, i.e., Node A, Node B, Node C, Node D, Node E, Node F and Node PE2, can return an echo reply packet to PE1 properly.

Figure 7:
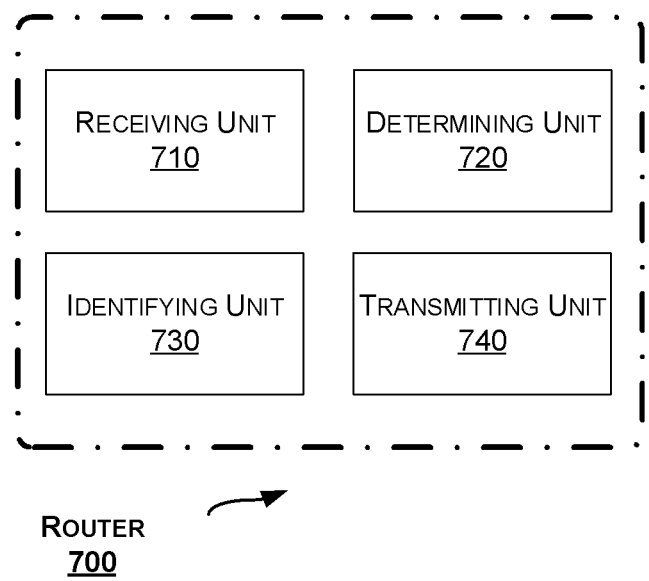
FIG. 7 is a block diagram of a router according to an embodiment of the present disclosure.

Correspondingly to the method 200 as described above, a router is provided. FIG. 7 is a block diagram of a router 700 according to an embodiment of the present disclosure. The router 700 can be e.g., Node A in FIG. 1.

As shown in FIG. 7, the router 700 includes a receiving unit 710 configured to receive an echo request packet containing a label stack. The router 700 further includes a determining unit 720 configured to determine from the label stack that forwarding to a downstream router is to be based on a binding segment identifier. The router 700 further includes an identifying unit 730 configured to identify a plurality of segments included in a binding segment associated with the binding segment identifier. The router 700 further includes a transmitting unit 740 configured to transmit an echo reply packet to a router originating the echo request packet, the echo reply packet containing information indicating a presence of the binding segment identifier in the label stack and indicating a segment identifier associated with each of the plurality of segments.

In an embodiment, the echo reply packet may be transmitted in response to determining that an outermost label of the label stack or a label in the label stack that is to be used for forwarding is associated with a predetermined TTL value.

In an embodiment, the information may be included in a Target FEC stack TLV.

In an embodiment, the Target FEC stack TLV may be included in an FEC stack change sub-TLV in a Downstream Detailed Mapping TLV.

In an embodiment, each of the plurality of segments may include one of an adjacency segment, a node segment or a binding segment.

The units 710-740 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 8:
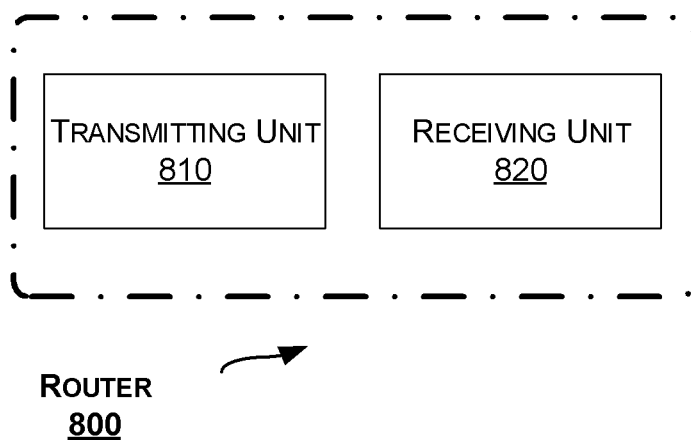
FIG. 8 is a block diagram of a router according to another embodiment of the present disclosure.

Correspondingly to the method 400 as described above, a router is provided. FIG. 8 is a block diagram of a router 800 according to an embodiment of the present disclosure. The router 800 can be e.g., PE1 in FIG. 1.

As shown in FIG. 8, the router 800 includes a transmitting unit 810 configured to transmit an echo request packet containing a label stack. The router 800 further includes a receiving unit 820 configured to receive an echo reply packet responsive to the echo request packet, the echo reply packet containing information indicating a presence of a binding segment identifier in the label stack and indicating a segment identifier associated with each of a plurality of segments included in a binding segment associated with the binding segment identifier. The transmitting unit 810 is further configured to transmit a further echo request packet containing a changed label stack in which the binding segment identifier is replaced with the respective segment identifiers associated with the plurality of segments.

In an embodiment, the information may be included in a Target FEC stack TLV.

In an embodiment, the Target FEC stack TLV may be included in an FEC stack change sub-TLV in a Downstream Detailed Mapping TLV.

In an embodiment, each of the plurality of segments may include one of an adjacency segment, a node segment or a binding segment.

The units 810-820 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 4.

Figure 9:
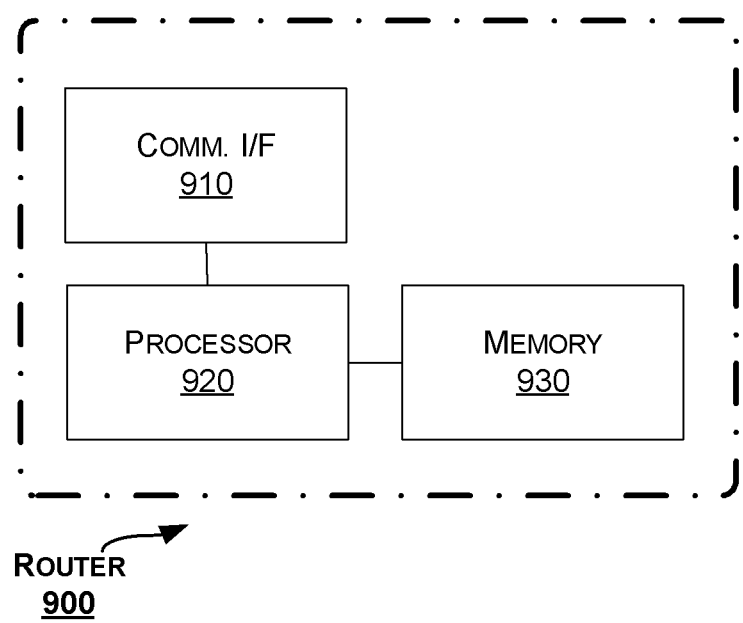
FIG. 9 is a block diagram of a router according to yet another embodiment of the present disclosure.

FIG. 9 is a block diagram of a router 900 according to another embodiment of the present disclosure.

The router 900 includes a communication interface 910, a processor 920 and a memory 930. The memory 930 contains instructions executable by the processor 920 whereby the router 900 is operative to perform the actions, e.g., of the procedure described earlier in conjunction with FIG. 2 or 4.

For example, the router 900 can be e.g., Node A in FIG. 1. Particularly, the memory 930 contains instructions executable by the processor 920 whereby the router 900 is operative to: receive an echo request packet containing a label stack; determining from the label stack that forwarding to a downstream router is to be based on a binding segment identifier; identify a plurality of segments included in a binding segment associated with the binding segment identifier; and transmit an echo reply packet to a router originating the echo request packet, the echo reply packet containing information indicating a presence of the binding segment identifier in the label stack and indicating a segment identifier associated with each of the plurality of segments.

In an embodiment, the echo reply packet may be transmitted in response to determining that an outermost label of the label stack or a label in the label stack that is to be used for forwarding is associated with a predetermined TTL value.

In an embodiment, the information may be included in a Target Forwarding Equivalence Class (FEC) stack Type-Length-Value (TLV).

In an embodiment, the Target FEC stack TLV may be included in an FEC stack change sub-TLV in a Downstream Detailed Mapping TLV.

In an embodiment, each of the plurality of segments may include one of an adjacency segment, a node segment or a binding segment.

Alternatively, the router 900 can be e.g., PE1 in FIG. 1. Particularly, the memory 930 contains instructions executable by the processor 920 whereby the router 900 is operative to: transmit an echo request packet containing a label stack; receive an echo reply packet responsive to the echo request packet, the echo reply packet containing information indicating a presence of a binding segment identifier in the label stack and indicating a segment identifier associated with each of a plurality of segments included in a binding segment associated with the binding segment identifier; and transmit a further echo request packet containing a changed label stack in which the binding segment identifier is replaced with the respective segment identifiers associated with the plurality of segments.

In an embodiment, the information may be included in a Target FEC stack TLV.

In an embodiment, the Target FEC stack TLV may be included in an FEC stack change sub-TLV in a Downstream Detailed Mapping TLV.

In an embodiment, each of the plurality of segments may include one of an adjacency segment, a node segment or a binding segment.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 920 causes the router 900 to perform the actions, e.g., of the procedure described earlier in conjunction with FIG. 2 or 4.

The computer program product may be configured as a computer program code structured in computer program modules. The computer program modules could essentially perform the actions of the flow illustrated in FIG. 2 or 4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a router for Label Switched Path (LSP) traceroute, comprising:
   receiving an echo request packet containing a label stack;
   determining from the label stack that forwarding to a downstream router is to be based on a binding segment identifier;
   identifying a plurality of segments included in a binding segment associated with the binding segment identifier; and
   transmitting an echo reply packet to a router originating the echo request packet, the echo reply packet containing information indicating a presence of the binding segment identifier in the label stack and indicating a segment identifier associated with each of the plurality of segments.

2. The method of claim 1, wherein the echo reply packet is transmitted in response to determining that an outermost label of the label stack or a label in the label stack that is to be used for forwarding is associated with a predetermined Time To Live (TTL) value.

3. The method of claim 1, wherein the information is included in a Target Forwarding Equivalence Class (FEC) stack Type-Length-Value (TLV).

4. The method of claim 3, wherein the Target FEC stack TLV is included in an FEC stack change sub-TLV in a Downstream Detailed Mapping TLV.

5. The method of claim 1, wherein each of the plurality of segments comprises one of an adjacency segment, a node segment or a binding segment.

6. A method in a router for Label Switched Path (LSP) traceroute, comprising:

transmitting an echo request packet containing a label stack;

receiving an echo reply packet responsive to the echo request packet, the echo reply packet containing information indicating a presence of a binding segment identifier in the label stack and indicating a segment identifier associated with each of a plurality of segments included in a binding segment associated with the binding segment identifier; and transmitting a further echo request packet containing a changed label stack in which the binding segment identifier is replaced with the respective segment identifiers associated with the plurality of segments.

7. The method of claim 6, wherein the information is included in a Target Forwarding Equivalence Class (FEC) stack Type-Length-Value (TLV).

8. The method of claim 7, wherein the Target FEC stack TLV is included in an FEC stack change sub-TLV in a Downstream Detailed Mapping TLV.

9. The method of claim 6, wherein each of the plurality of segments comprises one of an adjacency segment, a node segment or a binding segment.

10. A router, comprising:
a communication interface for receiving an echo request packet containing a label stack;
a memory; and
a processor in communication with the communication interface and the memory, the processor being configured to:
determine from the label stack that forwarding to a downstream router is to be based on a binding segment identifier;
identify a plurality of segments included in a binding segment associated with the binding segment identifier; and
cause, using the communication interface, the transmission of an echo reply packet to a router originating the echo request packet, the echo reply packet containing information indicating a presence of the binding segment identifier in the label stack and indicating a segment identifier associated with each of the plurality of segments.

11. A non-transitory computer readable storage medium having computer program instructions stored thereon, the computer program instructions, when executed by a processor in a router, enables the router to perform a method, the method comprising:
receiving an echo request packet containing a label stack;
determining from the label stack that forwarding to a downstream router is to be based on a binding segment identifier;
identifying a plurality of segments included in a binding segment associated with the binding segment identifier; and
transmitting an echo reply packet to a router originating the echo request packet, the echo reply packet containing information indicating a presence of the binding segment identifier in the label stack and indicating a segment identifier associated with each of the plurality of segments.

* * * * *